No. 692,155. Patented Jan. 28, 1902.
S. MacD. LANGSTON.
CUTTER HEAD.
(Application filed Aug. 29, 1901.)
(No Model.)
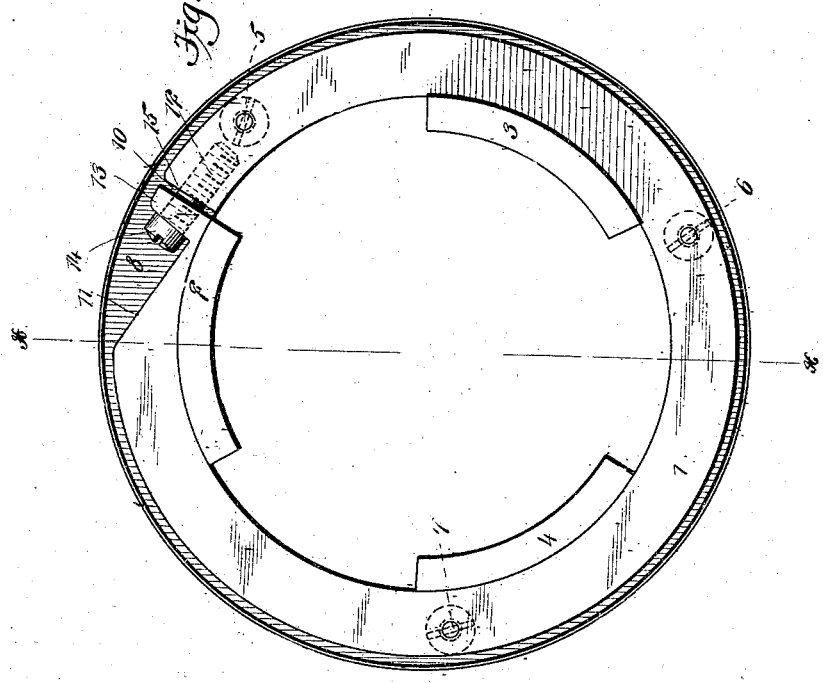

UNITED STATES PATENT OFFICE.

SAMUEL MacDONALD LANGSTON, OF PHILADELPHIA, PENNSYLVANIA.

CUTTER-HEAD.

SPECIFICATION forming part of Letters Patent No. 692,155, dated January 28, 1902.

Application filed August 29, 1901. Serial No. 73,689. (No model.)

*To all whom it may concern:*

Be it known that I, SAMUEL MACDONALD LANGSTON, a citizen of the United States, and a resident of Philadelphia, in the county of Philadelphia and State of Pennsylvania, have invented a new and Improved Cutter-Head, of which the following is a full, clear, and exact description.

My invention relates to cutter-heads of the type used in securing annular cutters upon a rotary shaft for the purpose of cutting thin material—such as tin-plate, brass, &c.—whether in rolls or sheets.

Reference is to be had to the accompanying drawings, forming a part of this specification, in which similar characters of reference indicate corresponding parts in both the figures.

Figure 1 is an elevation showing the cutter-head with cutter attached ready to be mounted upon a shaft, and Fig. 2 is a section on the line $x$ $x$ of Fig. 1 looking in the direction of the arrows.

An annular band of steel 1, having more or less elasticity, is provided internally with the broad concaved lugs 2, 3, and 4, which have such conformity that they readily engage the outer surface of a cylindrical shaft. By means of screws 5, 6, and 7 the cutter 8, provided with the cutting edge 9, is secured upon the ring. The ring is split, as shown at 10, and is provided with recesses 11, through which passes loosely the screw 12, provided with a screw-head 14 for the purpose of drawing the lug 10 into proximity with the end 15 of the ring 1. The screws 5, 6, and 7 hold the cutter-head rigidly in contact with about three-quarters of the ring, but leave about one-quarter of the ring free to move, except for the action of the screw 12. This part of the ring is provided with the lug 2, so that this lug has a slight relative movement toward the other lugs and also relatively to the position of the annular cutter 8.

The operation of my invention is as follows: It being desired to mount the cutter upon a shaft, the cutter-head is slipped over the cylindrical part of the shaft, which of course it fits quite snugly. The screw 12 is slightly loosened for the purpose. The loosening of the screw does not disturb the greater portion of the annular ring, but merely allows the free portion thereof, (shown at the left of Fig. 1,) upon which the lug 2 is mounted, to spring slightly outward. The idea is that when the cutter-head is placed upon the shaft the lugs 3 and 4 will fit the same exactly and are perfectly rigid relatively to each other. The lug 2 has a very slight movement toward and from the center of the axis of the shaft, and it is the movement of this lug alone which causes all of the lugs to grip firmly upon the shaft—that is to say, if the lugs 3 and 4 fit the shaft exactly and are immovable relatively to each other and the lug 2 has a slight movement toward and from the axis the movement of this lug alone is all that is necessary to tighten or loosen all of the lugs simultaneously upon the shaft. The annular ring 1 may be resilient or not, as desired, throughout its entire length; but in any event the free end (shown to the left of the drawing in Fig. 1) must be resilient, and if the other portions of the ring are secured to the cutter by means of the screws, so that said other portions have no movement relatively to said head, the effect will be the same as if about three-quarters of the ring were not resilient. It will be seen, therefore, that when the cutter is mounted upon the ring and the ring is mounted upon the shaft the tightening or loosening of the screw 12 by means of the screw-head 14 has the effect not only of tightening or loosening the cutter as a whole, but that it moves only a local part of the cutter-head and yet causes all of the lugs to engage firmly and to disengage positively.

By means of the above arrangement a cutter can be secured so rigidly upon the shaft as to be practically integral therewith and to have no rocking movement or undesirable play whatever and yet can be readily disengaged. There are no other parts which can work loose, and the seating of the cutter is about as perfect as could be desired. Of course any number of said cutters can be arranged upon a shaft side by side, and the lugs can be placed either in juxtaposition or made to break joints with each other, as desired.

Having thus described my invention, I claim as new and desire to secure by Letters Patent—

1. As an article of manufacture, a cutter-head comprising a split ring provided with bearing-lugs and also provided with normally free ends, an annular cutter rigidly secured to said split ring at a plurality of points but leaving one of said ends free to move, and a screw for actuating the movable end relatively to said other end.

2. As an article of manufacture, a cutter-head, comprising a split ring of resilient metal provided with normally free ends and with bearing-lugs, an annular cutter, screws for securing the same upon said ring so as to confine one of said free ends thereof, and means for actuating the other free end thereof relatively to said cutter for the purpose of engaging and disengaging a shaft.

3. As an article of manufacture, a cutter-head, comprising a split ring of resilient metal provided with lugs integral therewith and spaced apart from each other, and screws for securing an annular cutter to said ring, the relative location of said ring and screws being such that only a single lug is free to move relatively to said cutter, and a screw for dilating and contracting said ring, thereby actuating said single lug toward and from the center of said ring.

4. As an article of manufacture, a cutter-head, comprising a split ring provided with normally free ends, means for rigidly securing an annular cutter upon said ring, so that one of said free ends has a slight movement relatively to said cutter, lugs mounted within said ring, one of said lugs being on one of said normally free ends and free to move with the same, and means for changing the relative position of said normally free end for the purpose of actuating said lug movable therewith, and thereby clamping all of said lugs firmly upon the shaft.

In testimony whereof I have signed my name to this specification in the presence of two subscribing witnesses.

SAMUEL MacDONALD LANGSTON.

Witnesses:
EDWARD WALKO,
GEORGE W. LITTMAN.